(12) United States Patent
Hanley et al.

(10) Patent No.: US 7,179,508 B2
(45) Date of Patent: Feb. 20, 2007

(54) CONDUCTING POLYMER FILMS AND METHOD OF MANUFACTURING THE SAME BY SURFACE POLYMERIZATION USING ION-ASSISTED DEPOSITION

(75) Inventors: Luke Hanley, Chicago, IL (US); Sanja Tepavcevic, Chicago, IL (US); Yongsoo Choi, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 10/847,503

(22) Filed: May 17, 2004

(65) Prior Publication Data

US 2004/0247796 A1    Dec. 9, 2004

Related U.S. Application Data

(60) Provisional application No. 60/474,379, filed on May 30, 2003.

(51) Int. Cl.
C03C 14/12    (2006.01)
C03C 14/20    (2006.01)
C08G 61/00    (2006.01)
C08G 61/12    (2006.01)
C08L 65/00    (2006.01)

(52) U.S. Cl. .................. 427/525; 427/527; 427/593; 427/109; 427/166; 427/250; 427/568; 528/373; 528/375

(58) Field of Classification Search ............... 528/375, 528/373; 527/525, 527, 593, 109, 166, 250, 527/568
See application file for complete search history.

(56) References Cited

U.S. PATENT DOCUMENTS 5,273,849 A    12/1993  Harriott et al.
5,582,879 A    12/1996  Fujimura et al.
5,682,043 A    10/1997  Pei et al.
6,723,209 B2    4/2004  Baldwin et al.

FOREIGN PATENT DOCUMENTS

EP    0 612 860    10/1997
JP    2003297581    10/2003
JP    2004058648    2/2004

OTHER PUBLICATIONS

M.J. Vasile et al.,*J. Vac. Sci. Technol.* B7, 1954 (1989).
H. Usui, *Thin Solid Films*, 365, 22 (2000).
J.-Y. Kim et al., *J. Appl. Phys.*, 91, 1944 (2002).
B. Ni et al., *J. Phys. Chem.* B105, 12719 (2001).
L. Hanley et al., *Surf. Sci.*, 500, 500 (2002).
A. Moliton, in Handbook of Conducting Polymers, New York, 589 (1998).
S. Tepavcevic et al., *J. Am. Chem. Soc.*, 125, 2396-97 (2003).

*Primary Examiner*—Duc Truong
(74) *Attorney, Agent, or Firm*—Marshall, Gerstein & Borun LLP

(57) ABSTRACT

Conducting polymers having improved optical properties, and a method of manufacturing the conducting polymers, are disclosed. The conducting polymers are prepared by a process wherein organic ions and neutral oligomers are deposited simultaneously on a substrate surface to provide a conducting polymer film.

33 Claims, 10 Drawing Sheets a) Direct Ion Modification (IS = ion source, S = substrate)

b) Mass-Selected (MS) Ion Modification c) Ion Beam Assisted Deposition (N = neutral source)

d) Magnetron Sputtering (T = sputtering target, M = magnet)

e) Plasma Processing (E = electrode)

f) Pulsed Laser Deposition (L = laser)

a) Direct Ion Modification (IS = ion source, S = substrate)

b) Mass-Selected (MS) Ion Modification c) Ion Beam Assisted Deposition (N = neutral source)

d) Magnetron Sputtering (T = sputtering target, M = magnet)

e) Plasma Processing (E = electrode)

f) Pulsed Laser Deposition (L = laser)

US 7,179,508 B2

CONDUCTING POLYMER FILMS AND METHOD OF MANUFACTURING THE SAME BY SURFACE POLYMERIZATION USING ION-ASSISTED DEPOSITION

CROSS REFERENCE TO RELATED APPLICATIONS

This application claims the benefit of U.S. provisional patent application Ser. No. 60/474,379, filed May 30, 2003.

STATEMENT OF GOVERNMENTAL INTEREST

This invention was made with government support under contract CHE-9986226 and CHE-0241425 awarded by the National Science Foundation. The government has certain rights in the invention.

FIELD OF THE INVENTION

The present invention relates to improved conducting polymers, and particularly conducting polymer films applied to a substrate surface. The present invention also relates to a method of manufacturing conducting polymer films. In particular, a conducting polymer film of the present invention is prepared by simultaneously codepositing organic ions and neutral oligomers to a substrate surface. Conducting polymers prepared by the present method exhibit improved optical properties.

BACKGROUND OF THE INVENTION

Devices utilizing conducting polymers are the subject of intensive research in government, university, and corporate laboratories. A majority of the conducting polymers are produced by aqueous or liquid-based methods. Some conducting polymers are produced by thermal evaporation steps, occasionally combined with photochemical methods. Very few prior methods utilize energetic deposition of ions, and in many cases, the resulting polymer films had insufficient film properties for practical applications.

A wide variety of gas phase ions having kinetic energies of 1 to $10^7$ eV increasingly are being used for the growth and modification of state-of-the-art material interfaces (References 25, 26). Ions can be used to deposit thin films; expose fresh interfaces by sputtering; grow mixed interface layers from ions, ambient neutrals, and/or surface atoms; modify the phases of interfaces; dope trace elements into interface regions; impart specific chemical functionalities to a surface; anneal materials; and create micron- and nanometer-scale interface structures. Ion-induced processes are at the forefront of nanotechnology because they allow engineering of interfaces with specific wetability, hardness, resistance to corrosion, optical parameters, electronic functionality, dimensionality, and/or biocompatibility.

FIG. 1 contains schematic diagrams of several general experimental configurations in which ion surface modification is either central or plays an important role. (a) Direct ion modification involves simply an ion source (IS) to deposit ions (+) on a substrate (S). (b) Mass-selected ion modification filters out ions of a single mass-to-charge ratio for deposition on the surface. Ion beam synthesis, ion beam deposition, ion beam sputtering, ion beam sputter deposition, reactive ion beam etching, and dual ion beam sputtering are all varieties of direct or mass-selected ion modification. (c) Ion beam-assisted deposition simultaneously adds a source of neutral species (°) to deposit additional material or provide a reagent for ion-induced chemistry. Two variants on this method are electron beam ion-assisted deposition and chemical assisted ion beam etching. (d) Magnetron sputtering uses a magnetically confined discharge (M) to sputter ions and neutrals from a target (T) onto S. The discharge here and in plasma processing is established by a direct or alternating voltage difference applied between T and S. (e) Plasma processing uses a gas feed into the chamber to establish the discharge, with ideally no sputtering of the electrode. (f) Pulsed laser deposition employs a pulsed laser (L) to ablate a target material and thereby eject a plume of neutrals and ions for deposition onto S.

The versatility of ion-surface modification places the method at the center of several methods of film preparation, and is the subject of a wide range of fundamental research (References 25–27, 81–92). Not only can interface properties be adjusted experimentally via ion-surface interaction, but experimental data can be supplemented by an array of computational methods that accurately model those interactions (References 25, 28, 29). Ion-surface collisions also play an important role in other interface modification methods that might be considered unrelated at first glance, including plasma processing and pulsed laser deposition (References 25, 30, 31). However, a collision between a specific ion of a given kinetic energy with a surface is more readily modeled by computer simulations than are plasma or laser based methods.

Organic ions in the hyperthermal energy range (1–500 eV) play a critical role in many of the aforementioned energetic deposition processes, especially when organic vapors or polymeric targets are utilized (References 25, 26, 31). Hyperthermal polyatomic organic ion beams are advantageous for practical surface modification due to the unique collision dynamics and the ability to transfer intact chemical functionality to the surface (Reference 32). For example, organic ions often can be soft-landed as intact species upon many surfaces at $\leq 10$ eV collision energies (References 26, 33–35). Polymeric films for applications in optoelectronics can be grown from organic ion sources (Reference 36). Hyperthermal polyatomic organic ion beams also confine their modification to the top few nanometers of a surface, making them particularly useful for nanofabrication (Reference 37).

Oligo- and polythiophenes have been investigated extensively as conducting polymers for use in light-emitting diodes, electrochronic devices, field effect transistors, antistatic coatings, sensor films, organic photovoltaics, and recording materials (References 5, 93, 94). New methods of growing polythiophene films, and other conducting polymers, having desired optoelectronic properties are critical to the success of these various applications.

Methods utilizing polyatomic ion deposition display promise for the production of new types of polythiophene and other classes of conducting polymers. Fluorocarbon and siloxane polymeric films have been deposited directly onto various substrates from mass-selected, gaseous, organic cations with 5–200 eV kinetic energies (References 6–10b). Mass-selected organic cations (>20 eV) have been shown to create selective chemical bonds with self-assembled monolayers (References 11, 12) and carbon nanotubes (Reference 13). Ion-assisted deposition from a non-mass-selected source has produced new conducting polymers (References 14, 15). Atomic ions with 1–100 keV kinetic energies have been used to produce carbonaceous films from gaseous thermal beams of organic compounds (References 9, 16). Kiloelectronvolt atomic ions also have been utilized to modify polymer films (Reference 9), at times with the aim of creating conducting polymers (Reference 17).

Numerous publications discuss the use of ion-assisted deposition in the preparation of organic films. For example, M. J. Vasile et al., *Vac. Sci. Technol. B*, 7, 1954–1958 (1989) describes an ion-assisted deposition for organic film growth at very high ion kinetic energies (>10 keV). No conducting polymer properties were sought or demonstrated for the organic films produced in this publication.

A. Moliton, "Ion implantation doping of electroactive polymers and device fabrication," in *Handbook of Conducting Polymers*, 2nd ed., T. A Skotheim et al., Eds., Marcel Dekker, New York, N.Y., pp. 589–638 (1998), discusses ion deposition and implantation for the production and modification of conducting polymers. For example, this publication describes the modification of a polythiophene film using >10 keV atomic ions. Furthermore, the publication proposes that <1 keV ion-assisted deposition using nonreactive atomic ions also may be utilized for the production of a conducting polymer. The publication does not describe the use of polyatomic ions for this purpose, and no data is provided for any deposition at ion energies <1 keV.

H. Usui, *Thin Solid Films*, 365, 22–29 (2000) and J.-Y. Kim et al., *J. Appl. Phys.*, 91, 1944–1951 (2002) describe the use of ion beam-assisted deposition to produce thin organic films for conducting polymers and related applications. The publications do not describe the use of polyatomic ions in film growth. The publications also do not describe use of a separate source of chemically distinct organic compounds independent of those used in the ion source to assist film deposition. No polythiophene or thiophene-containing polymers are produced or disclosed.

M. B. J. Wijesundara et al., *J. Appl. Phys.*, 88, 5004–5016 (2000) describes ion sources, surface analysis, and data analysis in the deposition of organic films from mass-selected ions. M. B. J. Wijesundara et al., *Langmuir*, 17, 5721 (2001) and B. Ni et al., *J. Phys. Chem. B*. 105, 12719 (2001) discuss the deposition of organic films using mass-selected ions. J. T. Yates, Jr., *Experimental Innovations in Surface Science. A Guide to Practical Laboratory Methods and Instruments*, Springer-Verlag: New York, Ch. 198 (1998) describes a gas doser used to prepare conducting polymers. However, improved methods that provide more control over film properties than the ion deposition methods described to date still are required.

SUMMARY OF THE INVENTION

The present invention, therefore, is directed to conducting polymers, and an improved method of preparing the conducting polymers. More particularly, the present invention is directed to conducting polymers prepared by simultaneously codepositing organic ions and neutral organic oligomers to a substrate surface.

The present invention can be used to grow SPIAD-produced polythiophene thin films that strongly absorb UV/Vis light. The present SPIAD film deposition process provides a polythiophene-conducting polymer film having a UV/Vis absorption that more closely matches the solar spectrum at about 400 to about 700 nm than a polythiophene prepared solely from neutral oligomers. Therefore, in one embodiment, the invention is directed to improved plastic solar cells. The SPIAD-produced polythiophene films can be characterized by an array of surface analysis and optical characterization methods.

The present SPIAD process illustrates the effects of ion energy, ion structure, ion fluence, and ion/neutral species ratio on film chemistry, nanoscale morphology, and electronic structure. Film deposition is performed both with and without ion mass-selection and coincident evaporation of neutral species. These concepts are demonstrated on polythiophene thin films, whose properties are optimized for ultimate application in organic photovoltaics, also known as plastic solar cells. Although polythiophene films are illustrated herein, the present invention is not limited to polythiophene films, but extends to all films prepared by deposition of an organic ion and a neutral oligomer, e.g., terphenyl.

In accordance with one aspect of the present invention, a conducting polymer is prepared by simultaneously codepositing organic ions and neutral oligomers to a substrate to form a homopolymer. Another aspect of the present invention is to provide a method of preparing a conducting polymer by simultaneously codepositing organic ions of a first organic compound and neutral oligomers of a second organic compound to a substrate to form a copolymer.

Still another aspect of the present invention is to prepare a conducting polymer by codepositing about 50 to about 3,000 mole parts of the neutral oligomer per 1 mole part of the organic ion.

Yet another aspect of the present invention is to prepare a conducting polymer using an ion-assisted deposition, wherein the organic ions have a kinetic energy of about 500 electron volts (eV) or less.

Still another aspect of the present invention is to provide a conducting polymer film having a desired and selected morphology by a judicious selection of the organic ion, neutral oligomer, ion-to-oligomer molar ratio, and ion energy.

Another aspect of the present invention is to provide a conducting polymer film, e.g., polythiophene, having optical properties that are improved compared to the same conducting polymer film prepared by a prior-manufacturing method.

Another aspect of the present invention is to provide an article of manufacture, such as a plastic solar cell or photovoltaic, comprising a conducting polymer film prepared by the present method.

These and other novel aspects of the present invention will become apparent from the following detailed description of the preferred embodiments, taken in conjunction with the figures.

DETAILED DESCRIPTION OF THE PREFERRED EMBODIMENTS

Figure 1:
FIG. 1 contains schematic representations of various configurations for ion surface modification.
Figure 1:
Figure 1:
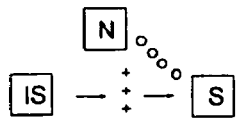
Figure 1:
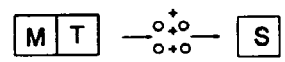
Figure 1:
Figure 1:
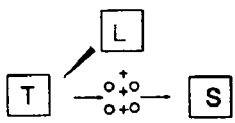

Organic cations can induce polymerization of monomers in the liquid phase (Reference 1). Ion-molecule reactions in the gas phase can lead to the formation of large ions, clusters, and even macroscopic particles (References 2–4). The present method demonstrates that cationic polymerization also can be induced at a gas-solid interface by hyperthermal organic cations coincident on a surface with a thermal beam of neutral organic oligomers. As illustrated herein, a polymer is formed, as opposed to a film of either the oligomers or a slightly extended oligomer.

Polyatomic organic ion deposition displays several advantages that indicate it should be widely applicable in nanotechnology, including:

1. Ion deposition parameters that systemically control the morphology of nanostructures forming on the surface and at the buried interface. A variety of nanoscale morphologies at the surface and buried interface have been observed (References 38, 39).

2. The effect of introducing beams of neutral atoms simultaneously with organic ion deposition to increase the growth rate and further tailor the film growth process. Such ion-neutral synergies have been studied in detail only for diamond-like carbon film growth (Reference 44) and atomic ion beam-assisted deposition (IBAD) (Reference 82).

3. The effect of the ion deposition process on the control of the optical or electronic properties of organic films. The control of film growth, especially when applied to modification of carbon nanotubes (Reference 40), implies that control of optoelectronic film properties is feasible. Non-mass-selected polyatomic ion deposition has successfully grown such films (References 36, 43).

4. The use of organic ion deposition as a practical manufacturing process for the production of organic films using commercial broad beam ion sources.

5. Comparison of films produced by mass-selected organic ion deposition to films produced by non-mass-selected organic ion deposition. The effect of the distribution of organic ions, radicals, electrons, and photons from the latter on the established film control effects displayed by mass-selection.

The present method, termed Surface Polymerization by Ion-assisted Deposition (SPIAD), is a new film growth process which takes advantage of some of the above-mentioned capabilities of polyatomic ion deposition. As discussed herein, SPIAD has been used to produce polythiophene and polyterphenyl conducting polymer films, and the former have demonstrated unique optical properties. The polythiophene films display an improved optical fluorescence, which makes the films useful in articles of manufacture, such as in light-emitting diodes, solar cells, and other applications (see "Handbook of Oligo- and Polythiophenes," D. Fichou, Ed., Wiley-VCH: Weinheim, 1999 and A. J. J. Heeger, *Phys. Chem. B*, 105, 8475–8491 (2001)).

As used herein, the term "SPIAD conducting polymers" denotes polymers produced in accordance with the present invention as opposed to conducting polymers produced by a prior method.

The term "SPIAD polythiophene" is used herein to denote a polythiophene prepared in accordance with the present invention, i.e., polythiophene films formed by organic ion and neutral oligomer deposition, as opposed to other types of polythiophene.

Oligo- and polythiophenes have been studied extensively as conducting polymers for use in organic photovoltaics, light-emitting diodes, electrochromic devices, field effect transistors, antistatic coatings, sensor films, and recording materials (References 41, 45, 46). The optimal properties of any conducting polymer film depends upon its ultimate application (Reference 41). For example, conducting polymer films for light-emitting diodes typically require disordered films with larger intermolecular distances to reduce charge transport and enhance luminescence (Reference 47). It follows that the development of conducting polymer films is best achieved by focusing on a specific ultimate application with a well-defined set of target film properties.

One ultimate application is solar cells. Plastic solar cells display the potential advantage of low production cost, due in part to low energy consumption during manufacturing (References 42, 46). Plastic solar cells also possess mechanical flexibility that permit new photovoltaic applications on easily retractable solar collectors, clothing, and sails. These and other applications currently are not feasible because of high cost of inorganic photovoltaics. Plastic solar cell production has focused mostly on printing methods of production. However, the highly price-sensitive energy market and the dearth of commercially viable plastic solar cells indicate a need for low cost alternate production methods.

Plastic solar cells are not as well developed as some other conducting polymer devices, such as light-emitting diodes. The best solar cells produced from oligo- or polythiophene display light to electrical conversion efficiencies of up to a few percent (References 41, 42, 46, 49–56). Both oligomers (e.g., sexithiophene or $C_{24}H_{14}S_6$) and polymers (e.g., poly (3-octylthiophene)) have been utilized as electron donors because they have high molar absorptivities in the UV/Vis (ultraviolet/visible), display complex morphologies, permit facile shifting of the optical band gap, and display photochemical stability (Reference 42). Quantum efficiencies of exciton formation for some of the thiophenic donor compounds approaches unity at certain wavelengths, but their optical absorption curves are not optimally matched to the solar spectrum.

One of the more common configurations of a plastic solar cell utilizes an indium tin oxide (ITO) layer on the substrate that serves as a bottom electrode, an electron acceptor layer, an electron donor layer composed of about 50 to about 300 nm thick organic film, such as a poly(alkylthiophene), and an about 10 nm aluminum (Al) or other metal overlayer that serves as the optically transparent upper electrode (Reference 42). Hybrid organic-inorganic solar cells using an oligothiophene also are being developed, although with a different electrode configuration (Reference 51). Charge separation of the exciton is achieved through use of an electron acceptor film. Various compounds have been used as acceptors, including $C_{60}$ (References 42, 46), carbon nanotubes (Reference 49), various polymers and dyes (References 53–55), nanophase $TiO_2$ (Reference 56), and CdSe nanorods (Reference 52).

Morphological effects have a profound influence on the performance of plastic solar cells. Molecular packing of the film dictates the intermolecular interactions that directly affect the optical properties of the donor film.(References 42, 46), whether it is oligo-.(Reference 51) or polythiophene (Reference 57). Furthermore, the donor/acceptor layer interpenetration must be maximized because an about 10 nm photoexcitation diffusion length limits charge separation efficiency (References 55, 58). Strategies for maximizing donor/acceptor interpenetration include film roughening (Reference 59), multilayers (Reference 60), variation of the nanostructure of the acceptor (References 49, 52), and covalent binding between the donor and acceptor (Reference 61). Finally, optical effects within, and at the interface of, the donor film also are significant (Reference 58). Many plastic solar cells are produced by spin coating or printing donor thiophenic compounds from the liquid phase or sublimation of oligothiophenes (References 5, 51). However, these deposition methods are limited in their ability to control the donor film morphology and its interaction with the acceptor layer. Ordered oligothiophenes also are evaporated onto substrates for plastic solar cells, but the films become disordered with complex morphologies when film thicknesses exceed a few nanometers (Reference 5).

There are several significant problems with plastic solar cells (both polythiophene and otherwise) that still exist, despite considerable research in this area over the last several decades. For example, 1. The light to electrical conversion efficiency of these devices remains too low for economic viability. For example, one of the most efficient plastic solar cells recently reported, which utilizes a nonpolythiophene polymer as the donor and $C_{60}$ as the acceptor, displays only a few percent efficiency (Reference 62). This low efficiency apparently is ultimately related to poor matching of the donor's optical absorption with the solar spectrum and poor charge separation.

2. The stability of these devices is limited (References 42, 50).

3. Toxicity and disposal issues must be considered for reagents and solvents used in the manufacturing process, as well as for the final solar cell.

The present invention can be used to grow polythiophene thin films that strongly absorb UV/Vis light. Thiophene ion energy, ion structure, ion fluence, and codeposition of neutral thiophene oligomers are used to produce a polythiophene conducting polymer film with UV/Vis absorption more closely matched to the solar spectrum than that of thin films prepared solely from evaporated neutral oligomers. These polythiophene films are characterized by several surface analysis and optical characterization methods.

Published information supports the hypothesis that energetic deposition can produce polythiophene films having a unique intra- and intermolecular structure. Molecular beam deposition of quaterthiophene ($C_{16}H_{10}S_4$) neutrals with a few eV of kinetic energy leads to the growth of thicker ordered films (Reference 63) than those possible with simple evaporation of thermal neutrals or control of the substrate temperature during evaporation (Reference 5). Furthermore, these quaterthiophene films display changes in photoluminescence consistent with ordering (Reference 64). Ordering of inorganic films by ion beam deposition is a well-known phenomenon (References 25, 27) and similar film ordering is feasible with polyatomic organic ion deposition. Furthermore, the extended electron conjugation of network covalent structure of these polythiophene films, as well as the radicals contained therein, generate new excited electronic states that enhance optical absorption (References 47, 65). The recognition of this fact has led to the use of low energy atomic ions and IBAD to grow light-emitting diodes from nonpolythiophene conducting polymers (Reference 66). Finally, conducting polymer films for light-emitting diodes and other applications in optoelectronics have been grown from non-mass-selected polyatomic ion sources (References 36, 43).

Other energetic methods have not successfully grown polythiophene thin films with useful optical properties, perhaps because the methods lack the level of deposition control available with polyatomic organic ion deposition. Plasma polymerized polythiophene films displayed enhanced electrical conductivity, but no useful optical properties were reported due to fragmentation of the thiophene structure in the plasma (Reference 67). Doping of polythiophene and other polymers with keV atomic ions has led to modest changes in electronic properties (Reference 65). However, keV ion doping has not been utilized widely because it also damages the organic films, likely converting them at least in part to graphitic carbon (Reference 25). Thiophene and an alkylthiophene were polymerized by low energy electrons and x-rays, respectively, but new optical properties were observed only in the latter case (References 68, 69).

In general, SPIAD is performed by combining organic, e.g., thiophene, ion deposition with simultaneous dosing of a neutral oligomer, e.g., α-terthiophene, vapor. A doser for the neutral oligomer is heated sufficiently such that the dose rate of the neutral oligomer is about $10^{13}$ to $10^{15}$ molecules/$cm^2$×second, as determined by a quartz crystal microbalance. The oligomer vapor is directed to a substrate. Separately, but simultaneously, a current of organic ions is directed to the substrate. Typically, one to four hours are required to prepare a single thin film of about 1 to about 100 square millimeters ($mm^2$) area using mass-selected organic ions. Films also can be prepared by the more rapid method of non-mass-selected organic ion deposition using a broad beam Kaufman ion source (Veeco-CS, 3 cm Ion Source), tuned to a minimum discharge voltage such that the parent organic ion, e.g., $C_4H_4S^+$, constitutes greater than 60% of the approximately 2 to 8 µA (microampere)/$cm^2$ total ion current. The non-mass-selected organic ion beams are deposited for about 5 to about 40 minutes to form a conducting polymer film.

An organic ion useful in the present method can be derived from any organic compound that, when polymerized, provides a conducting polymer. The organic ions are provided by electron impact, and have a relatively low kinetic energy, e.g., about 500 eV or less, when deposited on the substrate. The kinetic energy of the organic ions typically is about 5 to about 500 eV, preferably 10 to 250 eV. To achieve the full advantage of the present invention, the kinetic energy of the organic ions is about 100 to about 200 eV.

The organic ion is deposited on the substrate using an ion current of about 5 to about 200 nA/cm² in mass-selected embodiments, and about 0.1 to about 10 μA (microamperes)/cm² in non-mass-selected embodiments.

The oligomer typically contains two to about eight monomer units, and can contain up to 20 monomer units. The oligomer can be any organic compound that, after polymerization, provides a conducting polymer. The oligomer is deposited from the vapor phase, and polymerization is mediated by the organic ion. An oligomer useful in the present invention is capable of being volatilized in a vacuum of about $10^{-3}$ Torr at about 300K to about 700K, without decomposition, for codeposition with the organic ion onto a substrate.

A conducting polymer prepared by the present method can be a homopolymer, wherein the neutral oligomer comprises monomers having the same chemical identity as the organic ion. The conducting polymer also can be a copolymer, wherein the organic ion has a different chemical identity from the monomer comprising the neutral oligomer.

In accordance with an important feature of the present invention, the monomer ion and the neutral oligomer are codeposited in a ratio of about 50 to about 3,000, and preferably about 100 to about 1,000, mole parts of the neutral oligomer to 1 mole part of the organic ion. To achieve the full advantage of the present invention, the monomer ion and neutral oligomer are codeposited in a ratio of about 100 to about 400 mole parts of the neutral oligomer to 1 mole part of the organic ion. Alternatively stated, about $3 \times 10^{13}$ to about $1 \times 10^{15}$ organic ions/cm² are deposited for every $10^{17}$ neutral oligomer molecule/cm², and preferably, about $2 \times 10^{14}$ to about $1 \times 10^{15}$ organic ions/cm² are deposited for every $10^{17}$ neutral oligomer molecule/cm².

Accordingly, the organic ion and neutral oligomers of the monomers include, but are not limited to, thiophene, dithienothiophene, $C_{1-4}$alkyl-thiophenes, ethylenedioxythiophene, terphenyl, sexiphenyl, pentacene, diphenyl perylene, aniline, phenylene, phenylene vinylene, pyridine, a phthalocyanine, $C_{60}$, a carbon nanotube, a phthalocyanate, bithiazole, oligomers, and derivatives of all of the above, and mixtures thereof.

The substrate for the conducting polymer film is not limited, and can be, for example, a metal (e.g., gold), a semiconductor, a ceramic, a plastic, a polymer, a self-assembled monolayer, or a nanotube. Other substrates that are known to persons skilled in the art, and that are stable in a vacuum, also can be used.

This disclosure is directed primarily to the preparation of polythiophene. However, the present method is not limited to polythiophene. The present SPIAD method can be used in the preparation of essentially any organic conducting polymer, both homopolymers and copolymers, for example, polyterphenyl.

Examples of organic ions useful in the preparation of a polythiophene include, but are not limited to,

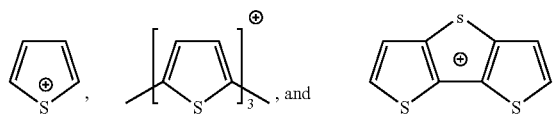

Example of a neutral oligomer useful in the preparation of a conducting polymer, like polythiophene, include, but are not limited to:

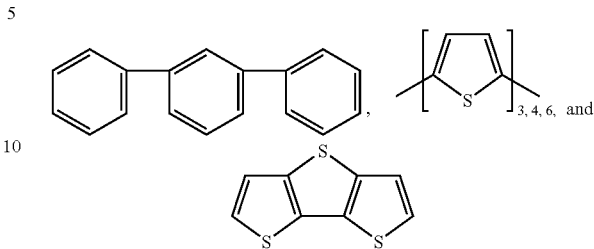

Other specific oligomers of thiophene include bithiophene, terthiophene, quarterthiophene, pentathiophene, hexathiophene, sepathiophene, octathiophene, and mixtures thereof.

The SPIAD method disclosed herein provides more control over film properties than previous ion deposition methods and polymerization is achieved by a cationic mechanism. Furthermore, the polythiophene films produced by SPIAD display an unexpected property of a conducting polymer, i.e., novel fluorescence peaks in the UV/Vis region.

As demonstrated herein, SPIAD produces conducting polymer films that maintain the chemical structure of the organic ion and neutral oligomer. As discussed in detail hereafter, a polythiophene film was produced using the SPIAD method with 100 eV thiophene ions and terthiophene oligomer vapor coincident on silicon (Si) and indium tin oxide (ITO) substrates maintained under vacuum. The resulting polythiophene displayed Raman spectral features similar to terthiophene films. The resulting polythiophene displayed fluorescence and UV/Vis absorption spectral features at times similar to, and at times different from, terthiophene films, depending upon the conditions used for organic ion and neutral oligomer deposition.

In the illustrative embodiment disclosed herein, SPIAD was performed by combining thiophene ion deposition with simultaneous dosing of α-terthiophene vapor. Beams of mass-selected thiophene ions (60 nA/cm²) were produced by electron impact, as previously described in the literature (References 7, 18). The terthiophene doser (Reference 95) was heated resistively to between 300° K. and 440° K., such that the dose rate of the neutral terthiophene was about $10^{13}$ to $10^{15}$ molecules/(cm²× second), as determined by a quartz crystal microbalance. One to four hours were required to prepare a single thin film of a few square millimeters area when using mass-selected ions. Monochromatic X-ray photoelectron spectra (XPS) were recorded at 44 eV of pass energy and normal takeoff angle without air exposure following deposition, as previously described in the literature (References 7, 18).

Figure 2:
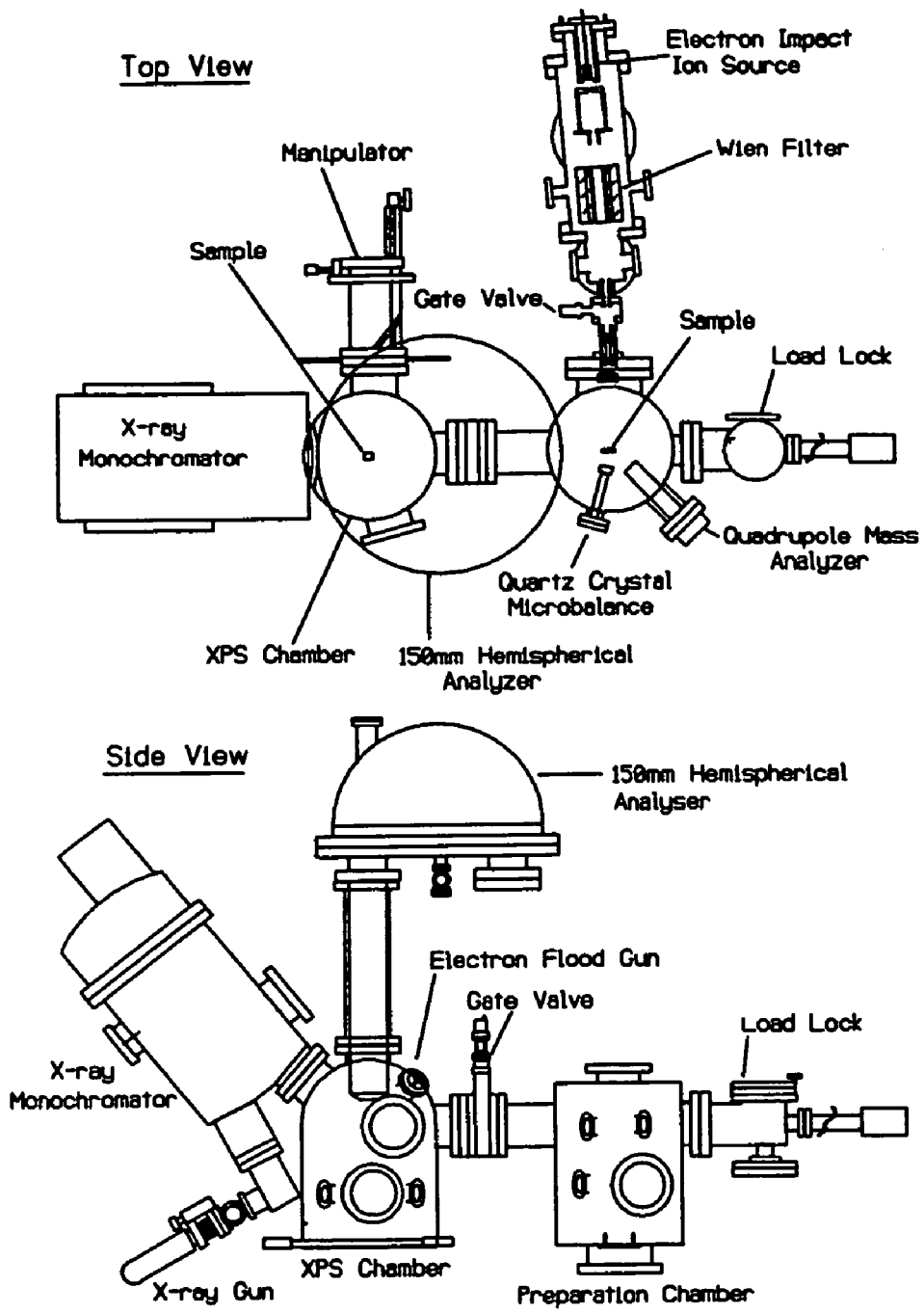
FIG. 2 is a schematic diagram of an instrument used for mass-selected ion deposition and monochromatic x-ray photoelectron spectroscopy.
Figure 3:
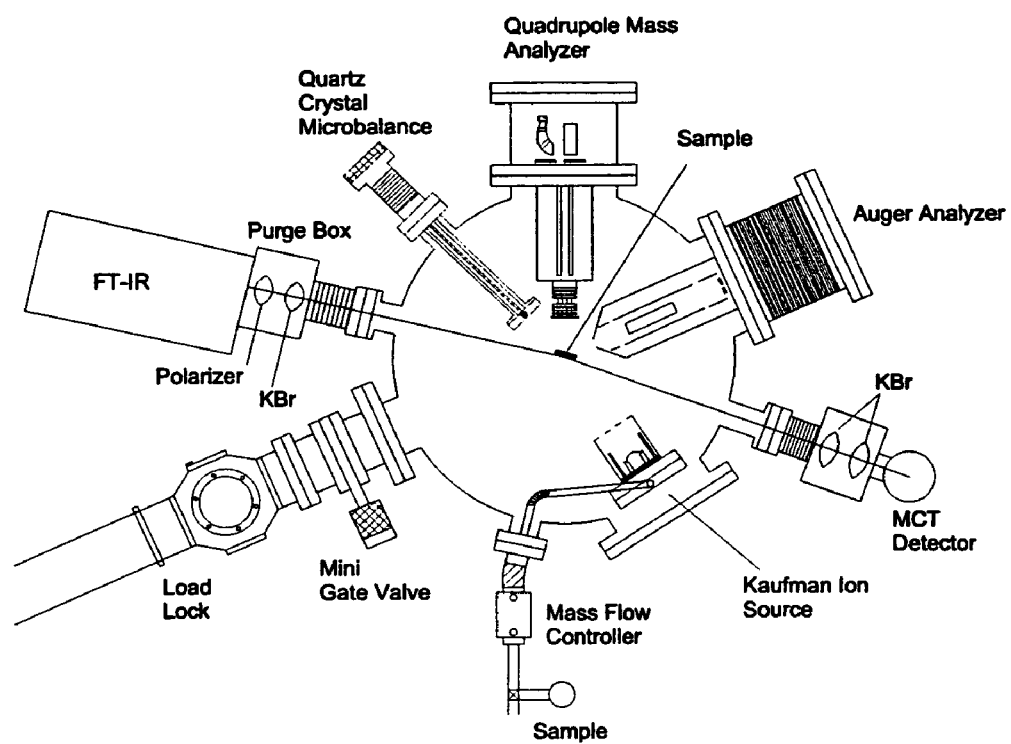
FIG. 3 is a schematic diagram of a Kaufman ion source instrument used for non-mass-selected polyatomic ion deposition.

The configuration of the two primary instruments utilized to prepare a conducting polymer according to the present method is described in FIGS. 2 and 3. FIG. 2 is a schematic diagram of an instrument for mass-selected ion deposition and monochromatic x-ray photoelectron spectroscopy. FIG. 2 shows the instrument used for mass-selected ion deposition and monochromatic x-ray photoelectron spectroscopy (XPS). Briefly, the instrument consists of a differentially pumped ion source attached to a preparation chamber. The ions are formed in an electron impact source at 80 eV electron energy, extracted and accelerated to about 1000 eV, mass-selected by a Wien filter, bent 3°, decelerated, refocused, and transported by a series of DC lenses to the target at normal incidence and at the appropriate kinetic energy. Typical ion currents for this instrument are 5–200 nA/cm² for $C_4H_4S^+$. The preparation chamber also has a quartz crystal microbalance to monitor film deposition (Sycon) and a homemade Faraday cup for ion beam analysis. The substrate temperature can be controlled by liquid nitrogen cooling and resistive heating.

The preparation chamber is connected to the XPS chamber via a loadlock to transfer samples from air into ultrahigh vacuum. The x-ray source has a 600 W AlKa x-ray gun mounted on a 0.7 m radius Rowland circle monochromator (VSW Ltd., Macclesfield, UK). The 150 mm hemispherical analyzer is equipped with a five channel detector (VSW). The XPS has been demonstrated to provide a maximum resolution of 0.48 eV at 3000 cps for the Ag (silver) 2p3/2 line of a clean Ag foil. There is an electron flood gun for sample neutralization. The entire system is pumped with ion and turbomolecular pumps, providing a base pressure of $2 \times 10^{-9}$ Torr.

Polythiophene films also were prepared in a different apparatus using non-mass-selected polyatomic ion. Deposition for 5 to 40 minutes produced a film of polythiophene. This method utilized a broad beam Kaufman ion source (Veeco-CS, 3 cm Ion Source) tuned such that the parent thiophene ion ($C_4H_4S^+$) constitutes over 60% of the approximately 2 to 8 µA/cm² total ion current (Reference 19). Similar terthiophene dosing conditions were used, as described above.

FIG. 3 is a schematic diagram of a Kaufman ion source instrument used for non-mass-selected deposition. In addition to the Kaufman ion source, this instrument is equipped with a 3 cm broad beam Kaufman ion source (Veeco-CS, 3 cm Ion Source) with gas input metered by a mass flow controller. This chamber is equipped with a load-lock sample transfer stage, quartz crystal microbalance, differentially pumped quadrupole mass analyzer (for ion and neutrals analysis), cylindrical mirror analyzer and electron gun for Auger electron spectroscopy, and Fourier transform infrared spectrometer for reflection absorption infrared spectroscopy. The substrate temperature can be controlled by liquid nitrogen cooling and resistive heating. The main chamber is pumped with a turbomolecular pump.

Polythiophene Film Growth

Figure 4:
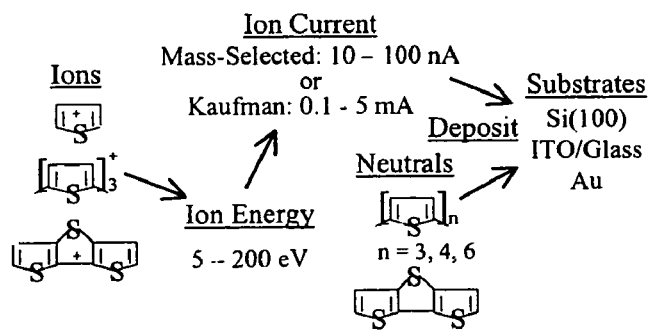
FIG. 4 summarizes the experimental parameters used in polythiophene film growth.

Polythiophene films were grown by varying several experimental parameters, as depicted in FIG. 4. In particular, the experimental parameters for polythiophene film growth were ion structures, ion kinetic energies, ion currents in mass-selected or Kaufman ion sources, neutral species, and substrate temperature (not shown). Control of the ion structure, ion energy, ion current, neutral deposition, and substrate temperature permit control of film ordering and polymerization that lead to long electron conjugation lengths. Gradients films produced by continuous variation of one or two of these parameters were produced for rapid screening of film properties (Reference 39).

Thiophene or other ions with 5–200 eV kinetic energies are produced and deposited on Si(110), indium tin oxide films on glass (ITO/glass), and Au (gold) substrates. Neutral beams of one or more oligothiophene, terphenyl, or other neutral oligomers are evaporated onto the substrate during ion bombardment, with variation in the ion/neutral ratio. These ions and neutrals were chosen because by other film growth methods they produce conducting polymers with favorable optical absorptions (References 5, 56, 70). Quaterthiophene and sexithiophene films display strong UV/Vis absorptions which shift further to the red with increasing molecular weight (Reference 5). Polymers of dithienothiophene absorb even further into the red than the oligothiophenes, showing promise for better matching to the solar spectrum (References 56, 70). Terthiophene films are not stable in vacuum (Reference 45), but polyatomic IBAD of terthiophene produces vacuum stable films with superior UV/Vis absorption (see below). Sexithiophene and quaterthiophene are available synthetically (Reference 71). H-atom dosing from a hot filament source can be used to suppress radicals in the films, if these radicals are found to be deleterious (Reference 65).

Either low current beams of mass-selected ions or high current beams of non-mass-selected ions are produced, the latter in a Kaufman ion source. Mass-selected beams allow well-defined experiments that are directly comparable to molecular dynamics simulations, albeit for only small area film growth. Mass-selected ion deposited films are compared with those produced by the Kaufman ion source. The Kaufman ion source produces thicker films over much larger areas and can be scaled up to a commercial process.

Figure 5:
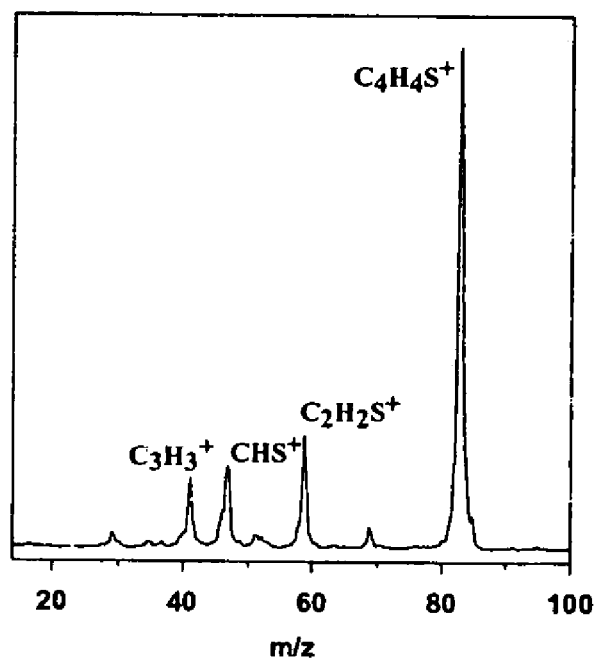
FIG. 5 is a mass spectrum of ions from a Kaufman ion source operating at a 35-volt discharge of thiophene vapor.

However, the Kaufman ion source produces several different ions (see FIG. 5) and difficult to quantify radicals that also contribute to film growth (References 30, 44). FIG. 5 is a mass spectrum of ions from the Kaufman ion source operating at 35 V discharge of thiophene vapor. FIG. 5 shows that the parent ion $C_4H_4S^+$ constitutes over 60% of the ion current from our Kaufman ion gun (Veeco-CS 3 cm Ion Source). The high parent ion current is achieved by operating the Kaufman ion source at a relatively low discharge voltage (near the ionization threshold).

Thiophene, terthiophene, and other thiophenic compounds often undergo only mild fragmentation in electron impact ionization due to their fused ring structure (Reference 72). High parent ion fractions should lead to films with the molecular structure relatively intact, when deposited at incident ion energies below 10 eV (Reference 73). The thiophene ion current ranges from 0.1–5 mA/cm² in the Kaufman ion source. The beam diameter of the source used here is 3 cm, but Kaufman ion guns with beam diameters up to 38 cm are commercially available (Veeco-CS) for commercial manufacturing processes.

Characterization of Polythiophene Film Structure by XPS, AFM, Mass Spectrometry

The SPIAD-produced polythiophene films are characterized elementally by x-ray photoelectron spectroscopy (XPS) and topologically by atomic force microscopy (AFM). The methods are well known and the subject of previously published papers utilizing all these methods (References 7, 25, 74).

Polythiophene thin films have been grown by deposition of both mass-selected and non-mass-selected ion beams. XPS was used to elementally analyze these thiophenic films.

Mass spectra for SPIAD films display peaks due not only to the 3T monomer, but also for higher peaks due to larger thiophene oligomers. FIG. 11b is a mass spectra of a film of the 3T monomer. Only the m/z 248 monomer ion of $3T^+$ is observed, with an isotopic distribution representative of its three constituent S atoms (see high intensity of m/z 250 peak in inset spectra). FIG. 11a shows mass spectra of SPIAD-produced polythiophene films from 200 eV mass-selected ions which display intense peaks at m/z 330, 411, and 493, attributed to $[3T]T^+$, $[3T]2T^+$, and $[3T]_2^+$, respectively (where T is a single thiophene). Higher mass peaks are occasionally observed (not shown), which are assigned as follows: m/z 507 as $[3T]_2CH_2^+$, m/z 614 as $[3T]_2TC_3H_3^+$, and m/z 702 as $[3T]_2T_2CHS^+$. Each of these peaks also displays an isotopic ratio consistent with the corresponding number of S atoms (not shown). Similar spectra are observed for non-mass-selected films except that higher mass ions up to $[3T]_3^+$ are also observed. These mass spectra clearly indicate that SPIAD leads to polymerization of terthiophene on the surface.

Mass spectra also indicate that the ion-to-neutral ratio affects the extent of polymerization during SPIAD. The average ion-to-neutral oligomer ratio is 1/150 for the 200 eV SPIAD films whose mass spectra are shown in FIG. 11a (top). However, FIG. 11a (bottom) is recorded from a spot on the film surface prepared using a lower ion flux (corresponding to an ion-to-neutral oligomer ratio of about 1/450). The top spectrum of FIG. 11a displays more intense $[3T]2T^+$ and $[3T]_2^+$ peaks at m/z 411 and 493, respectively, indicating a greater extent of polymerization for the higher ion fluence (i.e., higher ion-to-neutral ratio).

Figure 14:
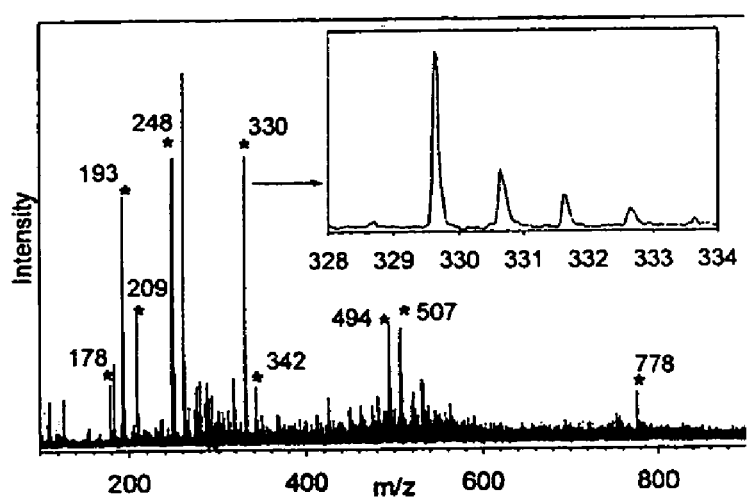
FIG. 14 is a mass spectrum of a 100 eV SPIAD polythiophene prepared by non-mass-selected ion deposition, with an ion to neutral oligomer ratio of 1:100 on a DIOS chip.

FIG. 14 also is a mass spectrum of a 100 eV SPIAD polythiophene film, deposited at an ion-to-neutral oligomer ratio of 1:100. All mass spectra in FIGS. 11a, 11b, and 14 are produced by SPIAD deposition directly on a nanostructured, oxidized silicon surface, i.e., a DIOS chip (Waters Corp.). The following table summarizes the intensities (in percent) of the M+1 and M+2 peaks relative to their main peaks M (normalized to 100%), reported as an average of several spectra.

|  | M | M + 1 | M + 2 | Ion |
|---|---|---|---|---|
| m/z | 178 | 179 | 180 |  |
| calc | 100 |  | 8.80 | $[T_2CH]^+$ |
| expt |  | 14.3 ± 2.3 | 14 ± 8 |  |
| m/z | 193 | 194 | 195 |  |
| calc | 100 |  | 8.80 | $[T_2C_2H_3]^+$ |
| expt |  | 13.7 ± 3.8 | 11.7 ± 6.0 |  |
| m/z | 209 | 210 | 211 |  |
| calc | 100 |  | 8.80 | $[T_2CHS]^+$ |
| expt |  | 16 ± 2 | 21 ± 5.3 |  |
| m/z | 248 | 249 | 250 |  |
| calc | 100 |  | 13.20 | $[3T]^+$ |
| expt |  | 60 ± 33 | 22.5 ± 6.8 |  |
| m/z | 330 | 331 | 332 |  |
| calc | 100 |  | 17.60 | $[3T]T^+$ |
| expt |  | 40 ± 19 | 12.7 ± 4.3 |  |
| m/z | 342 | 343 | 344 |  |
| calc | 100 |  | 17.60 | $[3T]TCH^+$ |
| expt |  | 29.3 ± 9.3 | 37 ± 5 |  |
| m/z | 494 | 495 | 496 |  |
| calc | 100 |  | 26.40 | $[3T]_2^+$ |
| expt |  | 44 ± 12 | 40 ± 3.2 |  |
| m/z | 507 | 508 | 509 |  |
| calc | 100 |  | 26.40 | $[3T]_2CH^+$ |
| expt |  | 58.3 ± 9.1 | 45 ± 3.3 |  |
| m/z | 778 | 779 | 780 |  |
| calc | 100 |  | 39.60 | $[3T]_3C_3H_2^+$ |
| expt |  | a | 51 ± 5.4 |  | aIndicates a very low signal-to-nose ratio, T = $C_4H_4S$, or thiophene.

Characterization of Polythiophene Film Optical Properties by UV/Vis and XPS

Figure 6:
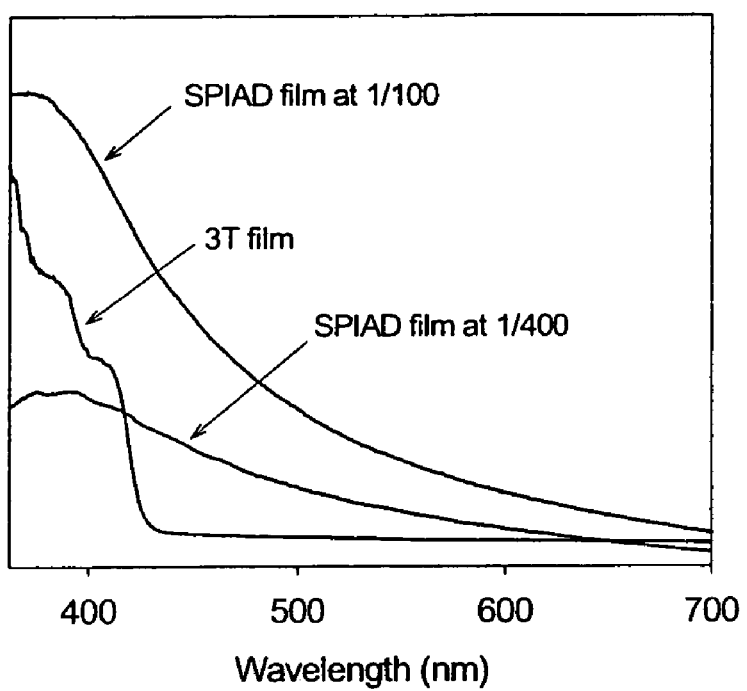
FIG. 6 contains UV/Vis spectra comparing SPIAD-produced polythiophene at 5 eV and 150 eV to a film of terthiophene.

Characterization of the optical properties of the polythiophene films is crucial to evaluating whether the films ultimately are useful in plastic solar cells. One optical method is simple UV/Vis absorption spectra on the film deposited on a transparent substrate (Reference 75). FIG. 6 contains the UV/Vis spectra of a polythiophene films on ITO/glass from simultaneous deposition of $C_4H_4S^+$ ions and terthiophene vapor. In particular, FIG. 6 shows a comparison between the ultraviolet/visible (UV/Vis) absorption spectra for a SPIAD-produced polythiophene film using a 1/100 or a 1/400 ion to oligomer ratio, along with the spectra of an evaporated terthiophene film (labeled 3T). These two SPIAD-produced polythiophene films display enhanced optical absorption between 400 and 550 nm. In contrast, terthiophene film only absorbs to about 450 nm. This result indicates that the optical properties of a conducting polymer film can be modified by SPIAD.

These polyatomic IBAD films are stable in vacuum, unlike native terthiophene (Reference 5), indicating $C_4H_4S^+$ ion-induced polymerization. Comparison of the UV/Vis spectra for this thiophenic film with the spectra of a terthiophene solution shows enhanced optical absorption between 400 and 550 nm for the former. This result indicates that modifying the optical properties of a thiophenic film is feasible by polyatomic IBAD.

Figure 12:
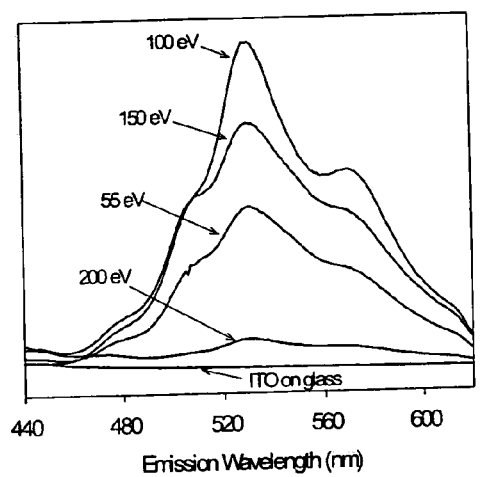
FIG. 12 contains photoluminescence spectra of SPIAD polythiophene at ion energies of 200, 150, 100, and 55 eV, with an ion-to-neutral oligomer ratio of 1:100.
Figure 13:
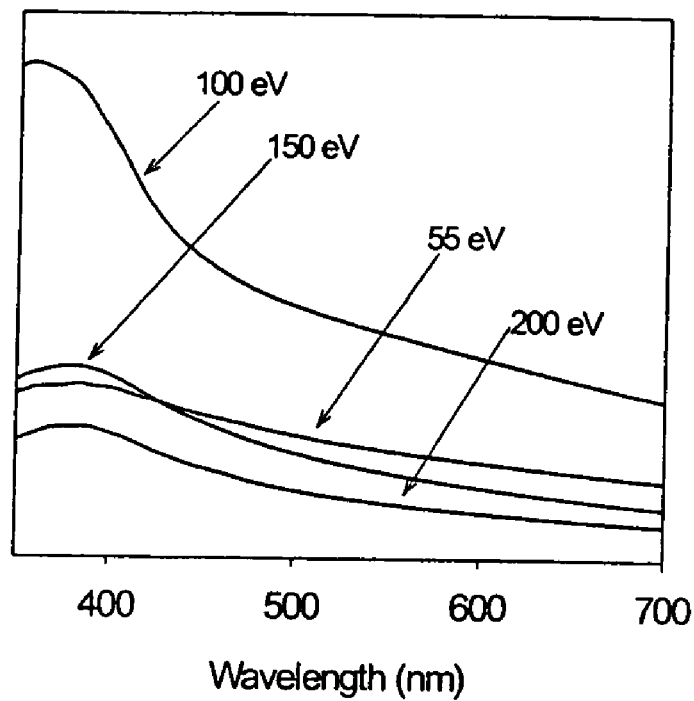
FIG. 13 contains UV/Vis spectra of SPIAD polythiophene at ion energies of 200, 150, 100, and 55 eV, with an ion-to-neutral oligomer ratio of 1:100.

The effect of ion energy on the photoluminescence spectra of SPIAD films at 1/100 ion-to-neutral oligomer ratio is shown in FIG. 12. Photoluminescence intensity varies with ion energy in order of: 100 eV>150 eV≈55 eV >>200 eV, based on the spectra shown in FIG. 12, and those of other films prepared under similar conditions. The effect of ion energy on the UV-VIS absorption of SPIAD films is shown in FIG. 13. The absorption peak at 390 nm in the 200 eV SPIAD film is the lowest of all four films, while the 100 eV film displays the strongest photoluminescence. Furthermore, the UV/Vis absorption at 390 nm (FIG. 6) correlates with the photoluminescence trends for ion energy, indicating the dependence of photoluminescence upon the efficiency of excitation at 390 nm. Overall, FIGS. 12 and 13 illustrate that a change in ion kinetic energy affects the optical properties of a SPIAD-produced polymer.

The electronic structure of polythiophene films produced by the above methods are evaluated using UV/Vis absorption (for Kaufman ion source films) or XPS (for mass-selected ion source films). The films with optical absorptions closest to the solar spectrum were subjected to further testing, as described below.

XPS data was collected for deposition on hydrogen-terminated Si substrates (Reference 10). The fluorescence data was recorded for films deposited on transparent ITO-coated glass substrates cleaned in solvents prior to deposition. Fluorescence spectroscopy was performed with 370-nm excitation at 45° off the surface normal, emission collection from the film backside, at 8-nm resolution (SLM Aminco 8000c, Champaign, Ill.). Raman spectra were recorded with 514.5-nm Ar$^+$ laser excitation (Renishaw Ramanscope 2000, Gloucestershire, UK).

Figure 7:
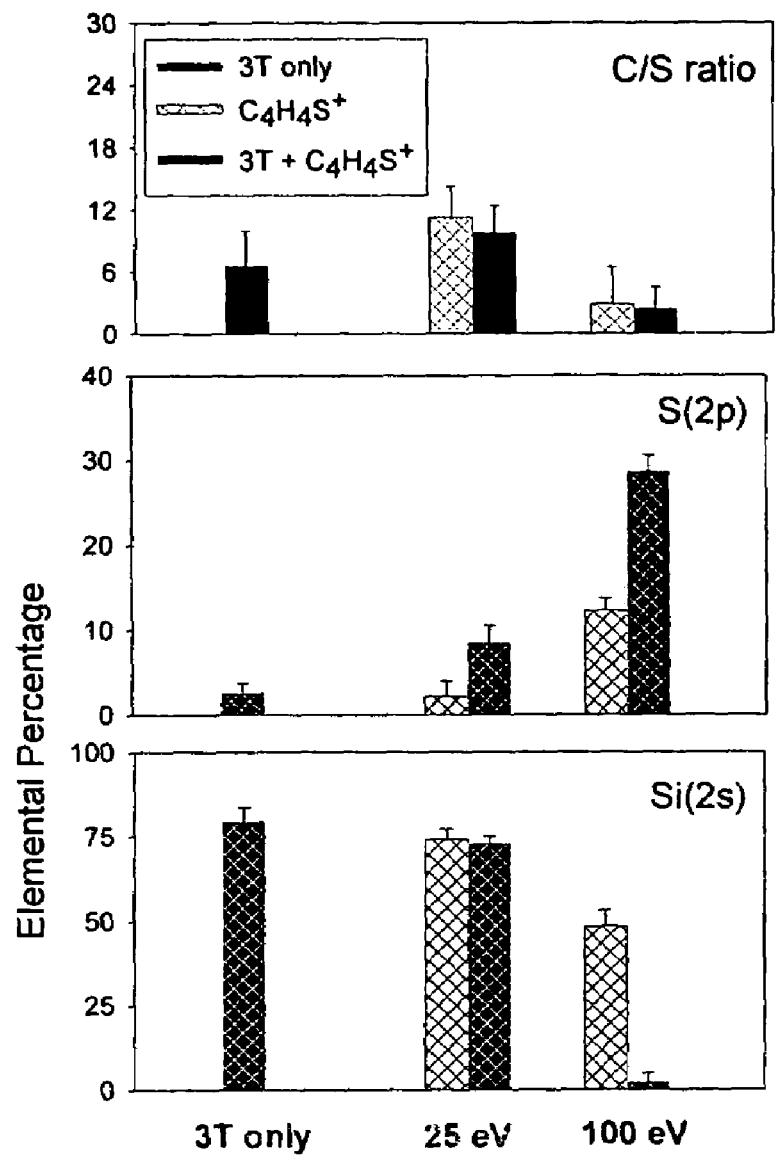
FIG. 7 summarizes the elemental content, determined by XPS, of the surface of about 10 nm films evaporated from terthiophene, thiophene ion, and a SPIAD-deposition of thiophene ion and terthiophene.

Surface polymerization was clearly demonstrated in the SPIAD-produced polythiophene films when analyzed by XPS. FIG. 7 shows the elemental content determined by XPS of the top of approximately 10 nm films evaporated directly from either terthiophene (labeled "3T only"), 25 or 100 eV thiophene ion deposition alone ("$C_4H_4S^+$"), and 25 or 100 eV SPIAD ("3T+$C_4H_4S^+$"). The "3T+$C_4H_4S^+$" codeposition illustrates an embodiment of the present invention. All $C_4H_4S^+$ ions were mass-selected, with fluences of $10^{16}$ ions/cm$^2$.

Scheme 1 portrays one of several classes of feasible polymer structures for SPIAD-produced polythiophene.

Scheme 1. Polythiophene film formation by SPIAD using 100 eV $C_4H_4S_+$ ions and terthiophene vapor

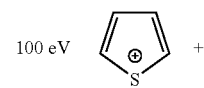

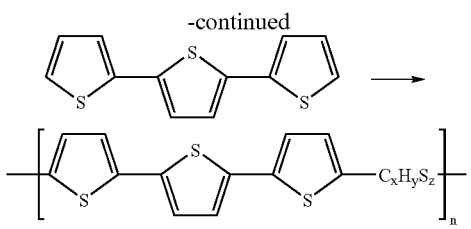

The SPIAD method provided a 2- to 3-fold increase in the total sulfur (S) content in the film compared to only isoenergetic thiophene ions. The one hundred eV SPIAD process provided a 10-fold increase in sulfur (S) compared to neutral dosing alone ("3T only"), and a 3-fold increase compared with 25 eV SPIAD. The silicon (Si) content for the 100 eV SPIAD process was the lowest of the three tests, indicating a film thickness greater than 10 nm. In particular, FIG. 7 shows S and Si percentages, as well as C/S ratios, for films grown on H—Si(100) substrates from 25 and 100 eV $C_4H_4S^+$, surface polymerization by ion-assisted deposition (SPIAD) with 25 and 100 eV $C_4H_4S^+$ and thermal terthiophene (3T+$C_4H_4S^+$), and thermal terthiophene alone (3T). Furthermore, XPS shows that 1/150 ratio films were the thickest (about 6 nm) and 1/900 ratio films were the thinnest (about 3 nm).

The C/S ratios for terthiophene dosing alone were within error bars of the theoretical value of four, with the mean exceeding this C/S ratio due to contributions from adventitious carbon on the Si substrate. Both direct deposition and SPIAD using 25 eV thiophene ions led to high C/S ratios of about 10, which indicates a low sulfur content in the deposited film. Both direct deposition and SPIAD using 100 eV thiophene ions led to low C/S ratios of about 3, which is consistent with polythiophene. The low oxygen content of less than a few percent is due largely to residual oxide and contaminants on the Si surface prior to deposition (data not shown).

The following table provides the elemental analysis for SPIAD-produced polythiophene and polyterphenyl. Each polymer was grown as a film at 200 eV using thiophene ions. For each polymer, the ratio of thiophene ion to terthiophene or terphenyl oligomer was 1:150. The films were prepared using mass-selected ions. The data shows that the SPIAD method provides a polymer, as opposed to a film of oligomers.

TABLE

| Oligomer/Elemental Content (%) | Carbon | Sulfur | Silicon[1] |
|---|---|---|---|
| Polythiophene | 77 ± 4.9% | 21 ± 6.0% | 2.6 ± 2.5% |
| Polyterphenyl | 90 ± 2.8% | 64 ± 2.1% | 39 ± 3.5% |

[1]Silicon content is from the silicon substrate into which deposition occurred.

Figure 8:
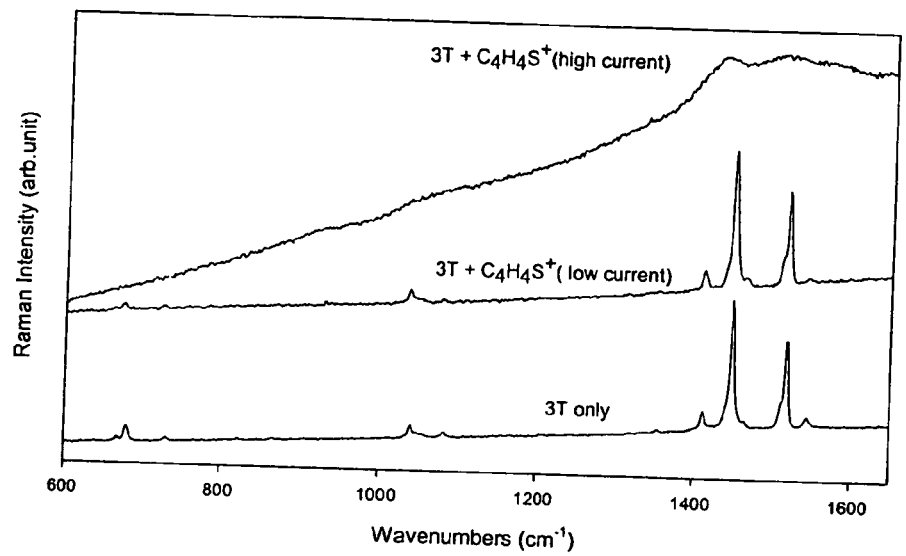
FIG. 8 contains Raman spectra of polythiophene films grown on ITO substrates from terthiophene alone and terthiophene with thiophene ion at low and high ion current.

Raman spectra of non-mass-selected 100 eV SPIAD polythiophene films are shown in FIG. 8. In particular, FIG. 8 contains Raman spectra of polythiophene films grown on ITO substrates by non-mass-selected surface polymerization by ion-assisted deposition (SPIAD) with 100 eV $C_4H_4S^+$ (at both low and high ion currents) and terthiophene vapor ("3T+$C_4H_4S^+$") and terthiophene vapor alone ("3T only"). Raman spectra of non-mass-selected 100 eV SPIAD films displayed strong vibrations at 1460 and 1530 $cm^{-1}$, which also are observed in terthiophene films (References 21, 22). These Raman features were strongest for films produced with low thiophene ion currents, and they also displayed weaker vibrations at 690 and 1050 $cm^{-1}$. High thiophene ion currents provided films having weak Raman lines at 1460 and 1530 $cm^{-1}$ only, which are broadened similar to doped polythiophene (Reference 22). The 1530 $cm^{-1}$ vibration was assigned to a C=C antisymmetric stretch, the 1460 $cm^{-1}$ to a C=C symmetric stretch, the 1050 $cm^{-1}$ to a C—H bend, and the 690 $cm^{-1}$ to a C—S—C deformation (References 21, 22).

Another experiment was directed to the vacuum stability of the SPIAD polythiophene films. In particular, the vacuum stability of SPIAD polythiophene films further showed that surface polymerization occurred. Terthiophene films are not stable under vacuum, unlike the higher-order oligothiophenes (Reference 5). Thus, the terthiophene films prepared by evaporation alone are rapidly removed under vacuum by sublimation. By contrast, the SPIAD films were stable in a vacuum for over four hours, a period during which pure terthiophene films completely sublime. Surface polymerization of terthiophene by SPIAD led to the formation of higher molecular weight, less volatile polythiophene.

Figure 9:
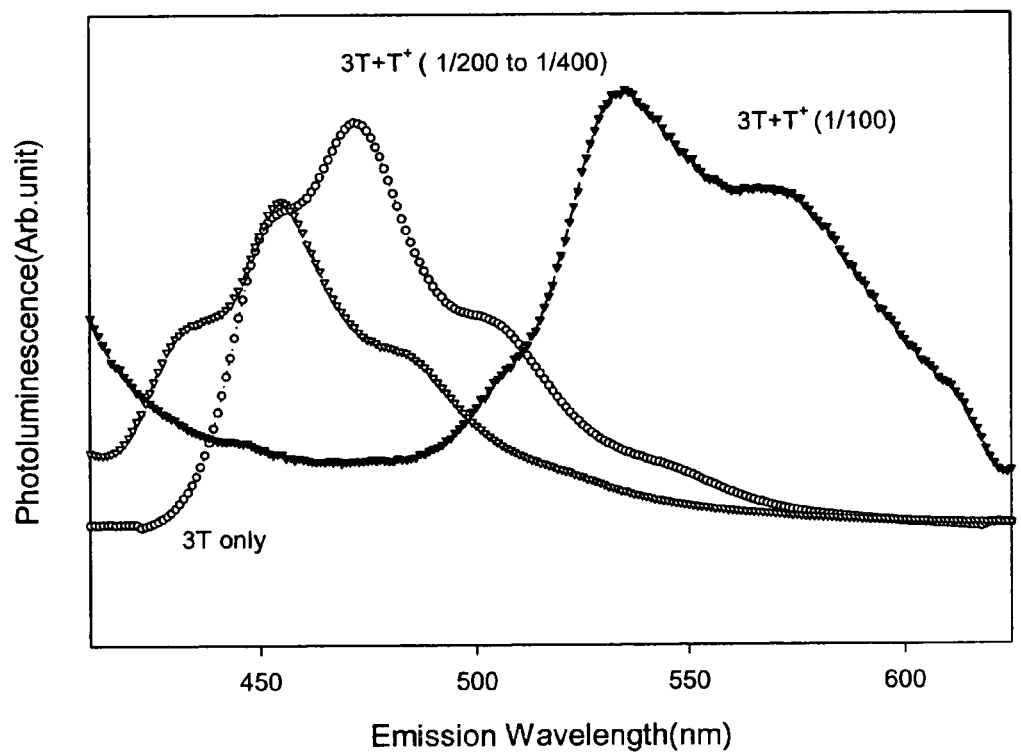
FIG. 9 contains fluorescence data for terthiophene film and SPIAD-produced terthiophene/thiophene ion films.
Figure 11:
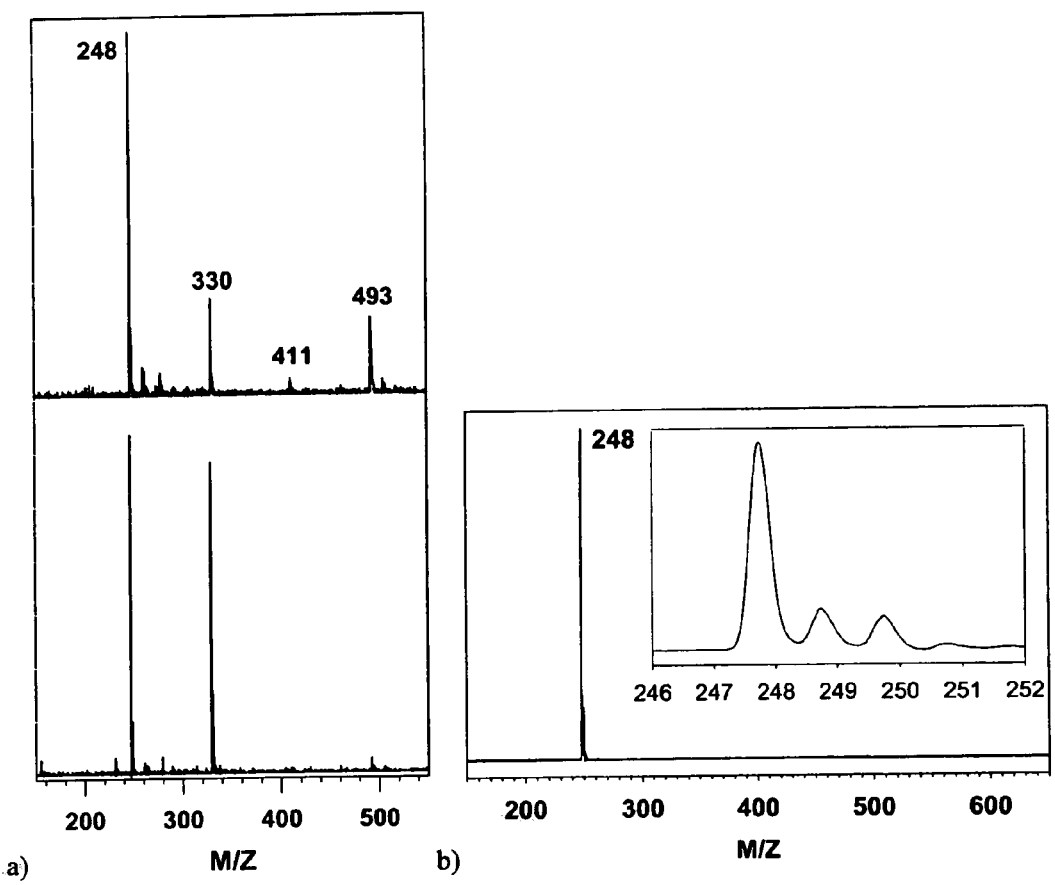
FIG. 11(a) contains mass spectra for SPIAD polythiophene films prepared by 200 eV mass-selected thiophene ion with coincident terthiophene at neutral ratios of 1:150 (top) and about 1:450 (bottom)
FIG. 11(b) is a mass spectrum of a film prepared by evaporation of terthiophene, with an insert showing the isotopic distribution of terthiophene ion.

Various SPIAD-produced polythiophene films displayed fluorescent spectral features and peak intensities similar to those of films prepared from terthiophene oligomers. However, other SPIAD-produced polythiophene films displayed additional and/or entirely new fluorescent features. FIG. 11 contains photoluminescence data for both terthiophene films (labeled "3T only") and 100 eV SPIAD polythiophene films from non-mass-selected ions (labeled "3T+T$^+$" together with actual organic ion/neutral oligomer ratios). All films were deposited on ITO coated glass substrates. Terthiophene films displayed a well-established photoluminescence spectrum with two peaks at 448 nm and 471 nm, when excited at 380 nm, but no significant fluorescence at wavelengths less than 430 nm (see R. Bosisio et al., Synth. Metals, 87, 23–29 (1997)). SPIAD-produced polythiophene films using ion-neutral mole ratios of 1/200 to 1/1400 displayed an additional photoluminescence spectral feature at 420 nm compared to films prepared from terthiophene alone. SPIAD-produced polythiophene films using at ion-neutral mole ratios of 1/100 displayed entirely new photoluminescence spectral features with peaks at 540 and 570 nm, but none of the original terthiophene only features. FIG. 9 demonstrates that the SPIAD deposition parameters can control the optical properties of a conducting polymer. The ITO substrate does not photoluminesce here.

A gradual change in the chemical and physical properties of a polythiophene is obtained on a single 1/150 SPIAD film (FIG. 10) by varying thiophene ion fluence (and indirectly ion/neutral ratio) across its surface. AFM images obtained by moving from the 1/150 SPIAD region with the higher thiophene ion fluence towards a region of lower ion fluence (FIG. 10c), look very similar to AFM images of the 1/450 SPIAD film (not shown). A region of yet lower ion fluence displays images similar to those of the 1/900 SPIAD film (not shown).

SPIAD films, grown at room temperature from hyperthermal ions and thermally evaporated neutrals, show some similar features to oligomer films grown at high substrate temperatures or films grown using hyperthermal supersonic oligomers beams. FIG. 12b shows a morphology that resembles one observed for α-8T films deposited on a high temperature substrate (about 420 K). AFM images with 1/450 ratio (FIG. 10c) show similar aligned grains but with dimensions of 150×500 nm, a narrower size distribution, and more compact. Star-shaped oligothiophenes designed and synthesized to improve film-forming properties have been found to create lamellar grain, or domain, features oriented layer-by-layer parallel to the surface, very similar in size and shape to those for 1/150 SPIAD films (FIG. 10a), although the former do not display the smaller grains observed here. For an ion to oligomer ratio of 1/900 (not shown), large spots with higher roughness inside indicate that 3T neutrals agglomerate on the surface in a random fashion that appears relatively unaffected by the few ions impacting the surface. AFM features inside those large spots are very similar to 3T only deposited films. These AFM results are consistent with Raman spectra for a 1/1100 ratio, which appear very similar to Raman spectra of the 3T only film.

Figure 10:
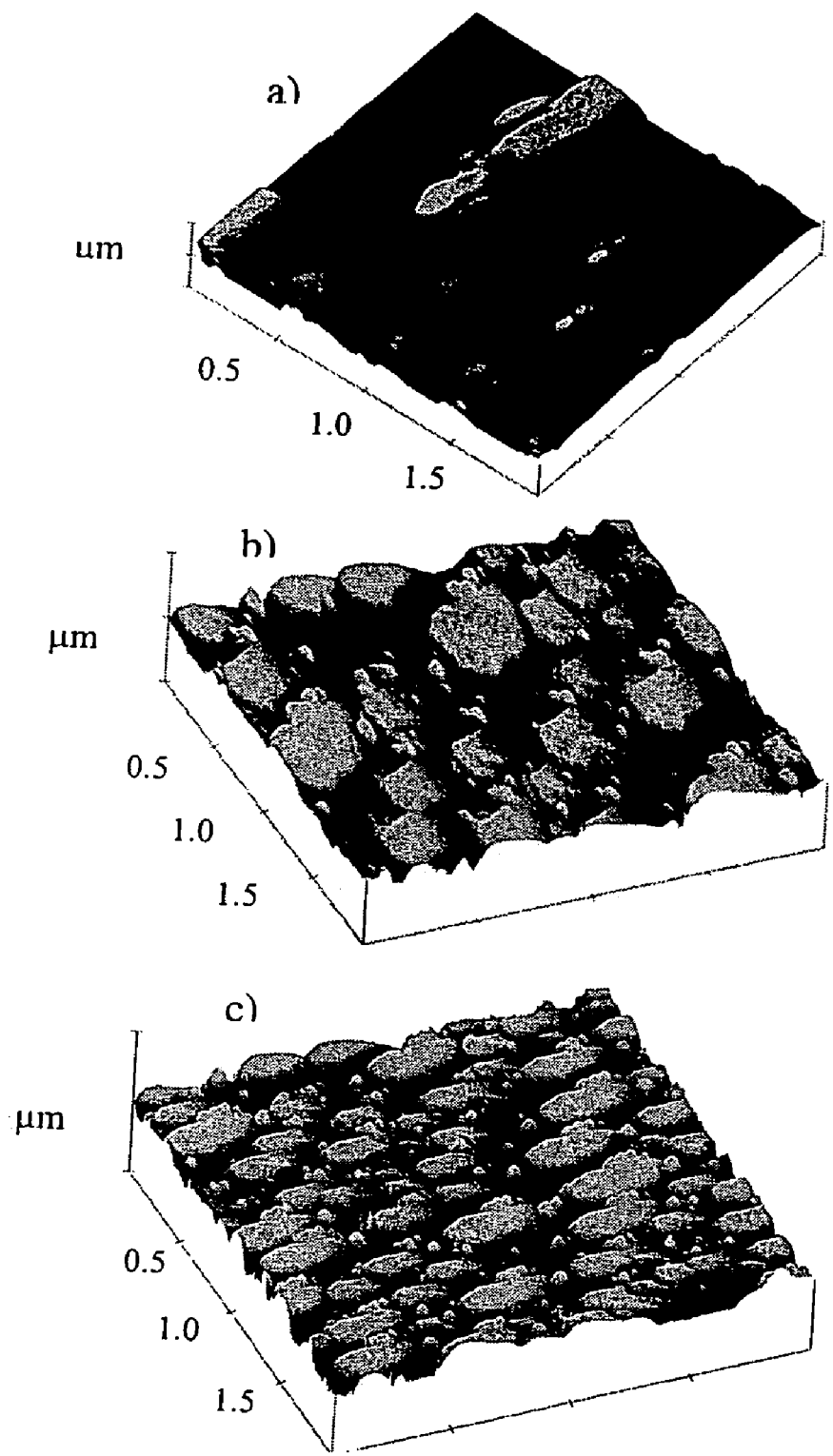
FIG. 10 contains AFM images of polythiophene produced by SPIAD using different ratios of ion to neutral oligomer (a) 1 to 150; (b) 1 to about 300, and (c) 1 to about 450.

In particular, FIG. 10 contains 2×2 μm AFM images of SPIAD films grown on. H—Si(100.) substrates from 200 eV $C_4H_4S^+$ and 3T at various ion/neutral ratios. The SPIAD films more closely resemble 3T only films than those that are direct ion deposited. However, the features of a SPIAD film change when moving from a region of higher to lower thiophene fluence on the surface. FIG. 10a shows a lamellar structure at the region of highest ion fluence (1/150 ion/neutral ratio) with aligned grains elongated in shape of dimensions of about 300×1200 nm. At a lower ion/neutral ratio spot on the surface (about 1/300), the grains are more oval in shape and smaller in size with dimensions of about 400×500 nm (FIG. 10b), but they are still aligned and are more closely packed. FIG. 10c shows the smallest elongated shape features with dimensions of 150×150 nm (about 1/450 ion/neutral ratio). The elongated grains of FIG. 10c are still aligned with adjacent grains and are yet more closely packed than those in FIG. 10b. The mean roughness of these different points on the gradient surface tracks the gradient in ion/neutral ratio, from 6 nm (FIG. 10a) to 8 nm (FIG. 10b). When a 1/450 ratio film is prepared directly (rather than on the gradient of a higher ion/neutral ratio film such as in FIG. 10c), the grains are similar in shape and size as in FIG. 10c, but the features are not as closely packed and mean roughness is about 10 nm, (not shown). No grains are observed for a SPIAD-produced polythiophene from a 1/900 ratio (not shown), but mostly small spots (not shown) and a few larger spots (grains of 3T neutrals). AFM of the small spots shows a mean roughness of about 18 nm, while inside one of the larger spots, the mean roughness is about 60 nm.

Accordingly, by a judicious selection of the organic ion, neutral oligomer, ion-to-oligomer ratio, and ion energy, which is within the skill of those in the art, lamellar conducting polymer film grains of about 1 to about 1000 nm in width, and about 1 to about 1000 nm in length, can be prepared. The present invention, therefore, allows a person skilled in the art to preselect a desired grain size, and provide a conducting polymer film having a grain size of about 1×1 nm to about 1000×1000 nm.

The above test results indicate that SPIAD proceeds by a cation-induced polymerization mechanism. Both mass-selected and non-mass-selected beams of thiophene ions lead to surface polymerization of terthiophene. Evidence of polythiophene formation is the C/S ratio, fluorescence, Raman spectra, and vacuum stability. The terthiophene oligomer remains intact for a significant fraction of the polymerization, as: indicated by fluorescence and Raman data. The fluorescent SPIAD-produced polythiophene films shown in FIGS. 10 and 11 can be produced with ion-oligomer mole ratios of 1/100 in a non-mass-selected ion source.

The above test results show that SPIAD is a viable method for the growth of a wide variety of conducting polymers and other organic thin films. SPIAD also permits the nanostructuring of these films because polyatomic ions only interact with the top few nanometers of a surface (References 7, 9, 19, 24). The selection of monomer ion structure, ion energy, and monomer ion/neutral oligomer flux ratio tune between the various deposition, polymerization, surface decomposition, and diffusion processes that collectively control surface morphology. Furthermore, non-mass-selected ion sources can be used to grow these polymer films on a large scale.

SPIAD-produced conducting polymers, including SPIAD-produced polythiophene, can be used in several commercial applications, including, but not limited to, organic solar cells or photovoltaics, light-emitting diodes, flat-panel displays, electronic inks, electrochronic devices, field effect transistors, sensor films, chemical sensors, biocompatible electronics, antistatic coatings, and recording materials.

The present method of manufacturing conducting polymers possesses several advantages and benefits over prior methods with respect to efficiency, cost benefit, and simplicity, for example. Specific advantages include:

1. The optical properties of a conducting polymer can be controlled through the SPIAD deposition parameters.
2. Film chemistry can be controlled by variation of monomer ion energy and structure.
3. Nanoscale film thickness, surface structure, and buried interface morphology car be controlled.
4. Various surface chemical gradients can be created in either the surface plane or normal to the surface (as a sharp of diffuse buried interface) by variation of monomer ion fluence or energy.
5. A wide array of substrates can be modified, with reaction barriers readily overcome by tuning monomer ion energy. Substrates used to date include metals, semiconductors, ceramics, polymers, plastics, self-assembled monolayers, and nanotubes.
6. Covalent binding of the conducting polymer to the substrate can be achieved.
7. Conducting polymer films grown excluding air and water vapor can be prepared, thereby allowing more control over interfacial oxidation and adsorption processes that can affect film electronic properties.
8. Straightforward correlation can be made between film properties and the independently variable parameters of monomer ion energy, monomer ion/neutral oligomer ratio, monomer ion and neutral oligomer structure, and monomer ion fluence.
9. No solvents and only small amounts of reagents are used in the environmentally friendly SPIAD process.
10. Control of polymer film inter- and intramolecular structure is achieved, including producing smooth yet molecularly ordered films.
11. Polyatomic organic ion beam-assisted deposition by combining direct ion deposition with neutral dosing is demonstrated.
12. A practical viability of the Kaufman ion source for large scale organic film growth is demonstrated.
13. Film growth role of nonionic particles emitted by the Kaufman source can be evaluated.
14. Polythiophene films having optical absorption in the UV/Vis that more closely matches the solar spectrum than films from solely evaporated oligomer are provided.
15. Structural characterization of polythiophene donor films is achieved.

The present method also is useful in the following applications:

1. SPIAD is a viable method for the growth of a wide variety of conducting polymers (including polythiophene and other conducting polymers), as well as other organic thin films.

2. The SPIAD process can be used to modify the interfacial properties of existing conducting polymers.

3. Non-mass-selected ion sources can be used to grow conducting polymer films on a manufacturing scale.

4. Mass-selected ion sources also can be adapted to grow conducting polymer films on a manufacturing scale.

5. Polythiophene films produced by SPIAD exhibit unique fluorescence and UV/Vis absorption spectra showing their utility in a variety of devices.

REFERENCES (1) R. B. Seymour et al., *J. Polymer Chemistry: An Introduction*, 3rd ed.; Marcel Dekker: New York, 251–258 (1992).
(2) W. Jacob, *Thin Solid Films*, 326, 1–42 (1998).
(3) Y. B. Pithawalla et al., *J. Phys. Chem. A*, 105, 3908–3916 (2001).
(4) K. L. Williams et al., *J. Am. Soc. Mass Spectrum*, 13, 518–529 (2002).
(5) D. Fichou et al., Single Crystals and Thin Films. In *Handbook of Oligo-and Polythiophenes*; D. Fichou, Ed.; Wiley-VCH: Weinheim, pp 185–282 (1999).
(6) M. B. Wijesundara et al., *Proc. Natl. Acad. Sci. U.S.A.*, 97, 23–27 (2000).
(7) M. B. J. Wijesundara et al., *J. Appl. Phys.*, 88, 5004–5016 (2000).
(8) P. N. Brookes et al., *J. Electron Spectrosc. Relat. Phenom.*, 121, 281–297 (2001).
(9) L. Hanley et. al., *Surf. Sci.*, 500, 500–522 1.0 (2002).
(10). E. R. Fuoco et al., *J. Appl. Phys.*, 92, 37–44 (2002).
(11) J. Shen et al., *J. Am. Chem. Soc.*, 121, 9762–9763; (1999)
(12) N. Wade et al., *J. Mass Spectrom.*, 37, 591–602 (2002).
(13) B. Ni et al., *J. Phys. Chem. B*, 105, 12719–12725 (2001)
(14) H. Usui, *Thin Solid Films*, 365, 22–29 (2000).
(15) J.-Y. Kim et al., J. Appl. Phys., 91, 1944–1951 (2002).
(16) M. J. Vasile et al., *Vac. Sci. Technol. B*, 7, 1954–1958 (1989).
(17) A. Moliton, A. Ion Implantation Doping of Electroactive Polymers and Device Fabrication. In *Handbook of Conducting Polymers*, 2nd ed., T. A. Skotheim et al., Eds., Marcel Dekker: New York, 589–638 (1998).
(18) L. Hanley et al., *J. Nucl. Instrum. Methods Phys. Res., Sect. B*, 157, 174–182 (1999).
(19) L. Hanley et al., *Nucl. Instrum. Methods Phys. Res.*, Sect. B, in press (2003).
(20) R. Bosisio et al., *Synth. Metals*, 87, 23–29 (1997).
(21) Y. Furukawa et al., *Synth. Metals*, 18, 151–156 (1987).
(22) G. Louarn et al., *J. Phys. Chem.,*. 99, 11399–11404 (1995).
(23) M. C. Kwan et al., *Chem. Vap. Deposition*, 3, 299–301 (1997).
(24) E. Fuoco et al., *J. Phys. Chem. B*, 105, 3950–3956 (2001).
(25) L. Hanley et al., *Surf. Sci.*, 500, 500 (2002).
(26) D. C. Jacobs, *Annu. Rev. Phys. Chem.*, 53, 379 (2002).
(27) J. W. Rabalais et al., *Phys. Rev. B*,. 53, 10781 (1996).
(28) N. Winograd et al., *Inter. J. Mass Spectrom. Ion Proces.*, 212, 467 (200:1).
(29) J. A. Townes et al., *J. Phys. Chem. A*, 24, 4587; (1999).
(30) W. Jacob, *Thin Solid Films*, 326, 1 (1998).
(31) K. L. Williams et al., *J. Amer. Soc. Mass Spectrom.*, 13, 518 (2002).
(32) C. Evans et al., *Anal. Chem.*, 74, 317, (2002).
(33) N. Wade et al., *J. Phys. Chem. B*, 104, 11230 (2000).
(34) J. Shen et al., *Inter. J. Mass Spectrom. Ion Proces.*, 182/183, 423 (1999).
(35) N. Wade et al., *J. Mass Spectrom.*, 37, 591 (2002).
(36) H. Usui, *Thin Solid Films*, 365, 22 (2000).
(37) L. Hanley et al., *J. Mass Spectrom.*, 34, 705 (1999).
(38) E. R. Fuoco et al., *J. Appl. Phys.*, 92, 37 (2002).
(39) M. B. J. Wijesundara et al., *Lang.*, 17, 5721 (2001).
(40) B. Ni, R. Andrews et al., *J. Phys. Chem. B*, 105, 12719 (2001).
(41) M. Granstrom et al., in *Handbook of Oligo-and Polythiophenes*, D. Fichou,. Ed. Weinheim: Wiley-VCH, 405 (1999).
(42) C. J. Brabec et al.,: in *Semiconducting Polymers*, G. Hadziioannou and P. F. van Hutten, Eds. Weinheim: Wiley-VCH, 515 (2000).
(43) J.-Y. Kim et al., *J. Appl. Phys.* 91, 1944 (2002).
(44) A. von Keudell, *Thin Solid Films*, 402, 1 (2002).
(45) D. Fichou, "Handbook of Oligo- and Polythiophenes," Weinheim: Wiley-VCH, 1999.
(46) A. J. Heeger, *J. Phys. Chem. B*, 105, 8475 (2001).
(47) F. Garnier, *Acc. Chem. Res.*, 32, 209 (1999).
(48) S. F. Baldwin, *Phys. Today*, 55, 62 (2002).
(49) E. Kymakis et al., *Appl. Phys. Lett.*, 80, 112 (2002).
(50) J. M. Kroon et al., *Thin Solid Films*, 403–404, 223 (2002).
(51) J. Ackermann et al., *Thin Solid Films*, 403–404, 157 (2002).
(52) W. U. Huynh et al., *Science*, 295, 2425 (2002).
(53) N. Noma et al., *Adv. Mater.*, 7, 647 (1995).
(54) K. Tada et al., *Jap. J. Appl. Phys. Pt.* 2, 36, L306 (1997).
(55) L. Sicot et al., *J. Appl. Phys.*, 90, 1047 (2001).
(56) S. Luzzati et. al., *Thin Solid Films*, 403–404, 52 (2002).
(57) K. Kaneto et al., *Jap. J. Appl. Phys. Pt.* 1, 41, 675 (2002).
(58) L. A. A. Pettersson et al., *J. Appl. Phys.*, 89, 5564 (2001).
(59) L. S. Roman et al., *Adv. Mater.*, 9, (1997).
(60). T. Kawai et al., *Jap. J. Appl. Phys. Pt.* 2, 35, L741 (1996).
(61) D. Hirayama et al., *J. Amer. Chem. Soc.*, 124, 532 (2002).
(62) S. E. Shaheen et al., *Appl. Phys. Lett.*, 78, 841 (2001).
(63) A. Podesta et al., *Surf. Sci.*, 464, L673 (2000).
(64) S. Innotta et al., *Appl. Phys. Lett.*, 76, 1845 (2000).
(65) A. Moliton, "Ion implantation doping of electroactive polymers and device fabrication," in *Handbook of Conducting Polymers*, T. A. Skotheim et al., Eds., 2nd ed. New York: Marcel Dekker, 589 (1998).
(66) R. Antony et al., *Appl. Phys. B*, 71, 33 (2000).
(67) L. M. H. Groenewoud et al., *Lang.*, 16, 6278 (2000).
(68) T. A. Land et al., *Surf. Sci.*, 268, 179 (1992).
(69) (a) J. E. Hernandez et al., *J. Phys. Chem. B*, 105, 8339 (2001); (b) H. Ahn et al., *J. Phys. Chem. B*, 106, 11404 (2002).
(70) M. Catellani et al., *Thin Solid Films*, 403–404, 66 (2002).
(71) J. Kagan et al., *Heterocyc.*, 20, 1937 (1983).
(72) F. W. McLafferty et al., *Interpretation of Mass, Spectra*, 4th ed. Mill Valley: University Science Books, 1993.
(73) H. Lim et al., *J. Phys. Chem. B*, 102, 4573 (1998).
(74)° F. A. Akin et al., *J. Biomed. Mater. Res.*, 57, 588 (2001).
(75) A. M. Botelho do Rego et al., *Exper. Meth. Phys. Sci.*, 38, 269 (2001).
(76) B. Servet et al., *Chem. Mater.*, 6, 1809 (1994).
(77) P. Dannetun et al., *J. Chem. Phys.*, 99, 664 (1993).
(78) H. Fujimoto et al., *J. Chem. Phys.*, 92, 4077 (1990).

(79) J. J. Apperloo et al., *Adv. Mater.*, 12, 1594 (2000).
(80) S. Timpanaro et al., *Adv. Mater.*, 13, 127 (2001).
(81) J. E. Greene et al., *Nucl. Instr. Meth. Phys. Res. B*, 27, 226 (1987).
(82) J. J. Cuomo et al., "Handbook of Ion Beam Processing Technology: Principles, Deposition, Film Modificaiton and Synthesis," Park Ridge: Noyes Publications (1989).
(83) W. D. Sproul, *Surf. Coat. Technol.*, 49, 284 (1991.)
(84) J. W. Rabalais, Chichester: Wiley, 1994.
(85) R. G. Cooks et al., *Acc. Chem. Res.*, 27, 316 (1994).
(86) W. Ensinger, *Nucl. Instr. Meth. Phys. Res. B*, 120, 270 (1996).
(87) M. Natasi et al., *Ion-Solid Interacitons: Fundamentals and Applications*. Cambridge: Cambridge University Press (1996).
(88) E. Chanson et al., *J. Appl. Phys.*, 81, 6513 (1997).
(89) S. M. Rossnagel, *J. Vac. Sci. Technol. B*, 16, 2585 (1998).
(90) W. R. Sobie, in *Vacuum & Thinfilm*, 36 (1999).
(91). E. T. Ada et al., *J. Phys. Chem. B*, 104, 5132 (2000).
(92) C. L. Quinteros et al., *J. Chem. Phys.*, 113, 5119 (2000).
(93) M. Granstrom et al., Electrooptical Polythiophene Devices. In *Handbook of Oligo-and Polythiophenes*; D. Fichou, Ed.; Wiley-VCH: Weinheim, 405–458 (1999).
(94) A. J. Heeger, *J. Phys. Chem. B*, 105, 8475–8491 (2001).
(95) J. T. Yates, Jr., *Experimental InnoVations in Surface Science. A Guide to Practical Laboratory Methods and Instruments*, Springer-Verlag: New York 198 (1998).

Obviously, many modifications and variations of the invention as hereinbefore set forth can be made without departing from the spirit and scope thereof, and, therefore, only such limitations should be imposed as are indicated by the appended claims.

What is claimed is:

1. A conducting polymer film produced by a method comprising simultaneously depositing organic ions and neutral oligomers onto a substrate, wherein the organic ions have a kinetic energy of about 5 to about 500 electron volts.

2. The conducting polymer film of claim 1 wherein the film is a polythiophene.

3. The conducting polymer film of claim 2 wherein the polythiophene has a fluorescence peak at 420 nm, when excited at 380 nm.

4. The conducting polymer film of claim 2 wherein the polythiophene has one or more fluorescence peaks at 500 to 630 nm, when excited at 380 nm.

5. The conducting polymer film of claim 2 wherein the polythiophene has a fluorescence peak at 540 nm, when excited at 380 nm.

6. The conducting polymer film of claim 2 wherein the polythiophene has a fluorescence peak at 570 nm, when excited at 380 nm.

7. The conducting polymer film of claim 2 wherein the polythiophene has a fluorescence peak at 540 nm and at 570 nm, when excited at 380 nm.

8. The conducting polymer film of claim 1 wherein the organic ions and the neutral oligomers are codeposited in a ratio of about 50 to about 3,000 mole parts of the neutral oligomer to 1 mole part of the organic ion.

9. The conducting polymer film of claim 1 wherein about $3 \times 10^{13}$ to about $5 \times 10^{15}$ organic ions/cm$^2$ are deposited for every $10^{17}$ neutral oligomer molecules/cm$^2$.

10. The conducting polymer film of claim 1 wherein the neutral oligomers comprise monomers having a same chemical identity as the organic ions.

11. The conducting polymer film of claim 1 wherein the neutral oligomers comprise monomers having a different chemical identity from the organic ions.

12. The conducting polymer film of claim 1 wherein the organic ions are mass-selected.

13. The conducting polymer film of claim 12 wherein the mass-selected organic ions are deposited at a current of about 5 to about 200 nanoamperes per cm$^2$.

14. The conducting polymer film of claim 1 wherein the organic ions are non-mass-selected.

15. The conducting polymer film of claim 14 wherein the non-mass-selected organic ions are deposited at a current of about 0.1 to about 10 microamperes per cm$^2$.

16. The conducting polymer film of claim 1 wherein the neutral oligomer contains 2 to 20 monomer units.

17. The conducting polymer film of claim 1 wherein the neutral oligomer contains 2 to 8 monomer units.

18. The conducting polymer film of claim 1 wherein the neutral oligomer is volatilized and stable at about 300K to about 700K in a vacuum of about $10^{-3}$ Torr.

19. The conducting polymer film of claim 1 wherein the neutral oligomer is deposited from the vapor phase.

20. The conducting polymer film of claim 1 wherein the neutral oligomer is deposited at a dose rate of about $10^{13}$ to about $10^{15}$ molecules/(cm$^2$×second), as determined by a quartz crystal microbalance.

21. The conducting polymer film of claim 1 wherein the organic ion is selected from the group consisting of thiophene, dithienothiophene, a $C_{1-4}$alkylthiophene, ethylenedioxythiophene, sexiphenyl, pentacene, diphenyl perylene, aniline, phenylene, phenylene vinylene, pyridine, a phthalocyanine, $C_{60}$, a carbon nanotube, bithiazole, oligomer thereof derivatives thereof, and mixtures thereof.

22. The conducting polymer film of claim 1 wherein the organic ion comprises a thiophene.

23. The conducting polymer film of claim 1 wherein the neutral oligomer comprises monomer units selected from the group consisting of thiophene, dithienothiophene, a $C_{1-4}$alkylthiophene, ethylenedioxythiophene, terphenyl, sexiphenyl, pentacene, diphenyl perylene, aniline, phenylene, phenylene vinylene, pyridine, a phthalocyanine, $C_{60}$, a carbon nanotube, a phthalocyanate, bithiazole, derivatives thereof, and mixtures thereof.

24. The conducting polymer film of claim 1 wherein the neutral oligomer comprises an oligomer of thiophene.

25. The conducting polymer film of claim 24 wherein the oligomer of thiophene is selected from the group consisting of bithiophene, terthiophene, quarterthiophene, pentathiophene, hexathiophene, septathiophene, octathiophene, and mixtures thereof.

26. The conducting polymer film of claim 1 wherein the organic ion comprises thiophene and the neutral oligomer is selected from the group consisting of bithiophene, terthiophene, quarterthiophene, pentathiophene, hexathiophene, sepathiophene, octathiophene, and mixtures thereof.

27. The conducting polymer film of claim 1 wherein the substrate is selected from the group consisting of a metal, a semiconductor, a ceramic, a plastic, a polymer, a self-assembled monolayer, and a nanotube.

28. The conducting polymer film of claim 1 wherein the conducting polymer is present on the substrate in lamellar grains of having dimension of about 1×1 nanometers to about 1000×1000 nanometers.

29. The conducting polymer film of claim 28 wherein a preselected grain size is achieved by utilizing a sufficient molar ratio of organic ions to neutral oligomer and a sufficient ion energy.

30. An article of manufacture comprising a conducting polymer prepared by a method comprising simultaneously depositing organic ions and neutral oligomers onto a substrate, wherein the monomer ions have a kinetic energy of about 5 to about 500 electron volts.

31. The article of claim 30 wherein the conducting polymer is a polythiophene.

32. The article of claim 30 selected from the group consisting of a plastic solar cell, a light-emitting diode, a flat-panel display, an electronic ink, an electrochronic device, a field effect transistor, a sensor film, a chemical sensor, an organic photovoltaic, a biocompatible electronic, an antistatic coating, and a recording material.

33. The article of claim 30 wherein the article is a plastic solar cell or an organic photovoltaic.

* * * * *

UNITED STATES PATENT AND TRADEMARK OFFICE
CERTIFICATE OF CORRECTION

PATENT NO. : 7,179,508 B2 Page 1 of 1
APPLICATION NO. : 10/847503
DATED : February 20, 2007
INVENTOR(S) : Luke Hanley et al.

It is certified that error appears in the above-identified patent and that said Letters Patent is hereby corrected as shown below:

In the Claims:

At Column 22, line 34, "oligomer thereof derivatives" should be -- oligomer derivatives --.

At Column 22, line 57, "sepathiophene" should be -- septathiophene --.

At Column 22, line 66, "of having dimension" should be -- having dimensions --.

Signed and Sealed this

Twenty-second Day of July, 2008

JON W. DUDAS
*Director of the United States Patent and Trademark Office*